United States Patent
Behzad et al.

(10) Patent No.: US 8,055,207 B2
(45) Date of Patent: Nov. 8, 2011

(54) RF RECEIVER WITH FAST BASEBAND SWITCHING

(75) Inventors: Arya Reza Behzad, Poway, CA (US); Rohit V. Gaikwad, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 540 days.

(21) Appl. No.: 11/807,814

(22) Filed: May 30, 2007

(65) Prior Publication Data

US 2008/0139156 A1 Jun. 12, 2008

Related U.S. Application Data

(60) Provisional application No. 60/868,818, filed on Dec. 6, 2006, provisional application No. 60/868,881, filed on Dec. 6, 2006, provisional application No. 60/868,878, filed on Dec. 6, 2006.

(51) Int. Cl.
*H04B 17/00* (2006.01)

(52) U.S. Cl. ........ 455/67.14; 455/133; 455/134; 455/135; 455/277.1; 455/277.2; 455/67.11; 375/267; 375/349

(58) Field of Classification Search .......... 455/67.11, 455/67.14, 67.15, 67.16, 67.7, 70, 550.1, 455/552.1, 553.1, 132–147, 272–275, 276.1–277.2, 455/69, 115.1–115.4, 278.1, 279.1; 375/267, 375/295, 340, 349; 370/338

See application file for complete search history.

(56) References Cited

U.S. PATENT DOCUMENTS

| | | | | |
|---|---|---|---|---|
| 6,456,856 | B1 * | 9/2002 | Werling et al. | 455/575.5 |
| 7,277,686 | B2 * | 10/2007 | Gierl et al. | 455/277.1 |
| 7,310,503 | B2 * | 12/2007 | Ido | 455/140 |
| 7,515,939 | B2 * | 4/2009 | Catreux-Erceg et al. | 455/562.1 |
| 7,519,126 | B2 * | 4/2009 | Kim | 375/267 |
| 2005/0185738 | A1 * | 8/2005 | Gaikwad | 375/340 |
| 2005/0186986 | A1 * | 8/2005 | Hansen et al. | 455/553.1 |
| 2005/0250452 | A1 * | 11/2005 | Walton et al. | 455/63.4 |
| 2005/0281348 | A1 * | 12/2005 | Kim | 375/267 |
| 2006/0025178 | A1 * | 2/2006 | Tao et al. | 455/562.1 |
| 2006/0046773 | A1 * | 3/2006 | Aycin et al. | 455/552.1 |
| 2006/0203785 | A1 * | 9/2006 | Kim | 370/338 |
| 2006/0291583 | A1 * | 12/2006 | Hammerschmidt et al. | 375/295 |
| 2007/0067704 | A1 * | 3/2007 | Altintas et al. | 714/795 |
| 2007/0110197 | A1 * | 5/2007 | Bagchi et al. | 375/349 |

* cited by examiner

*Primary Examiner* — Junpeng Chen (74) *Attorney, Agent, or Firm* — Garlick Harrison & Markison (57) ABSTRACT

A receiver includes a plurality of RF receiver modules, a plurality of analog baseband sections, a plurality of analog to digital conversion sections, and a digital baseband processing module. The RF receiver modules convert inbound RF signals into a plurality of inbound analog signals. When the receiver is in a first mode, one of the plurality of analog baseband sections is active to adjust one of the plurality of inbound analog signals to produce an adjusted inbound analog signal; one of the plurality of analog to digital conversion sections converts the adjusted inbound analog signal into an inbound digital signal; and a portion of the digital baseband processing module is active to convert the inbound digital signal into inbound data.

8 Claims, 10 Drawing Sheets

RF RECEIVER WITH FAST BASEBAND SWITCHING

This patent application is claiming priority under 35 USC §119 to three provisionally filed patent applications:
(1) METHOD AND SYSTEM FOR SIGNAL PROCESSING IN WIRELESS COMMUNICATIONS, having a provisional filing date of Dec. 6, 2006, and a provisional Ser. No. of 60/868,818;
(2) FUNCTIONALITIES OF A CHIP, having a provisional filing date of Dec. 6, 2006, and a provisional Ser. No. of 60/868,881; and
(3) METHOD AND SYSTEM FOR SIGNAL PROCESSING, having a provisional filing date of Dec. 6, 2006, and a provisional Ser. No. of 60/868,878.

CROSS REFERENCE TO RELATED PATENTS

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communication systems and more particularly to wireless communication devices having an integrated circuit operating within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802,11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to capture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. Many techniques may be used for receiving the multiple RF signals including an algorithm for decoding a space-time and/or space-frequency code.

For a multiple-input-multiple-output (MIMO) wireless communication, the transmitter and receiver each include multiple paths. In such a communication, the transmitter parallel processes data using a spatial, frequency, and/or time encoding function to produce one or more streams of data. The maximum number of parallel streams is equal to the minimum of the number of transmitter and receiver RF processing paths. The transmitter includes multiple transmission paths to convert each stream of data into multiple RF signals. The receiver receives the multiple RF signals via multiple receiver paths that capture the streams of data utilizing a spatial, frequency, and/or time decoding function. The captured streams of data are combined and subsequently processed to recover the original data.

Most transceivers that support MIMO and/or MISO communications also support SISO communications. In many instances, a MIMO or MISO communication is set up using a SISO communication. In addition, transceivers spend a majority of its time in a waiting mode (e.g., sniff mode waiting to receive a communication, carrier sense, etc.) and very little of its time transmitting and receiving data in a communication. If, during the waiting mode, the transceiver is enabled in a MIMO mode or MISO mode, it consumes an unnecessary amount of power. One solution to reduce power consumption of a MIMO or MISO transceiver in a waiting mode is to include RF switches that enable only one of the MIMO or MISO receiver paths such that the remaining MIMO or MISO receiver paths can be disabled. While this works well to reduce power consumption, it requires the use of RF switches. If the RF switches are implemented off-chip, they add cost to the transceiver. If the RF switches are implemented on-chip, they consume a significant amount of die real estate.

Therefore, a need exists for a low power mode for a MIMO and/or MISO transceiver without the use of RF switches.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
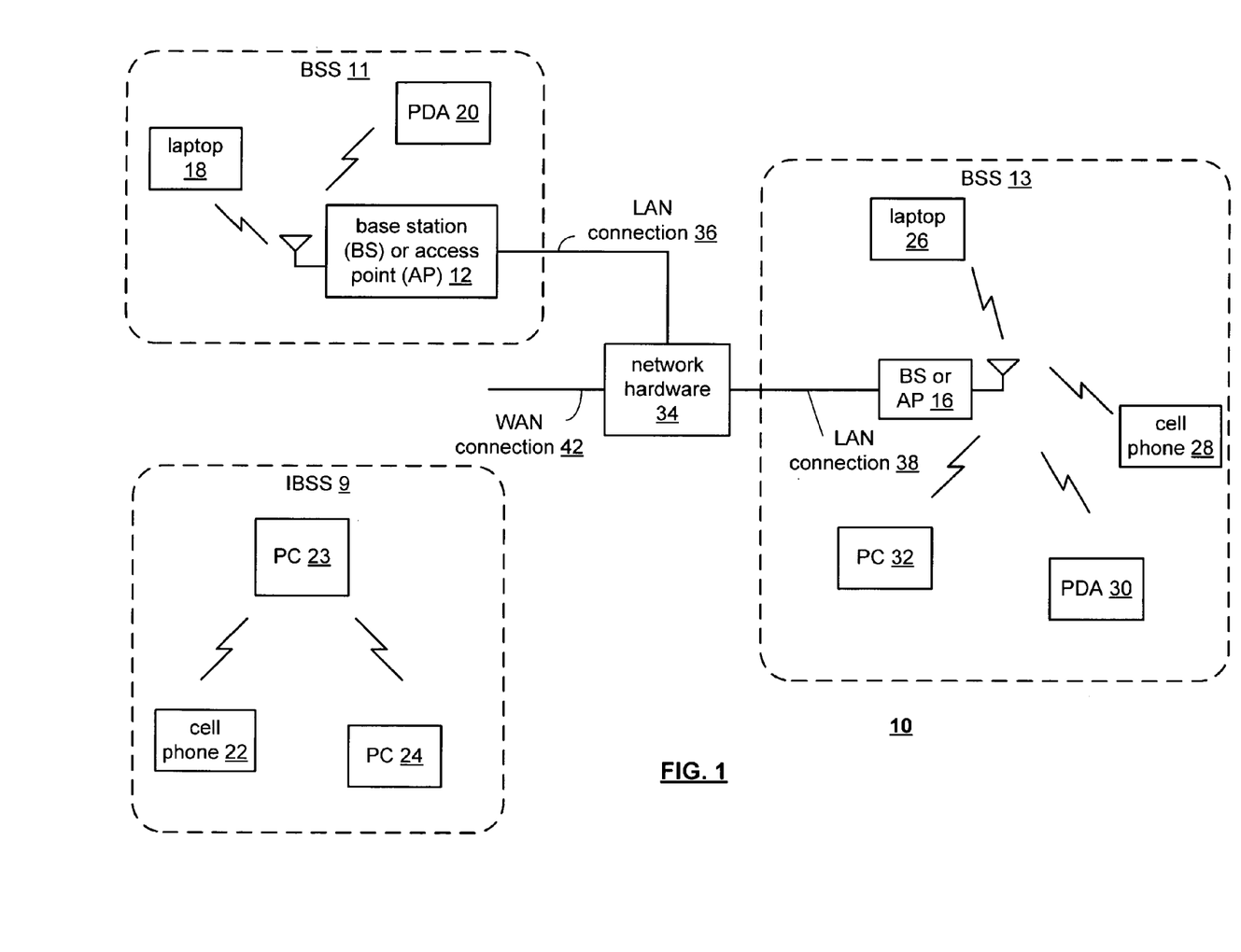
FIG. 1 is a schematic block diagram of an embodiment of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIGS. 2-13.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
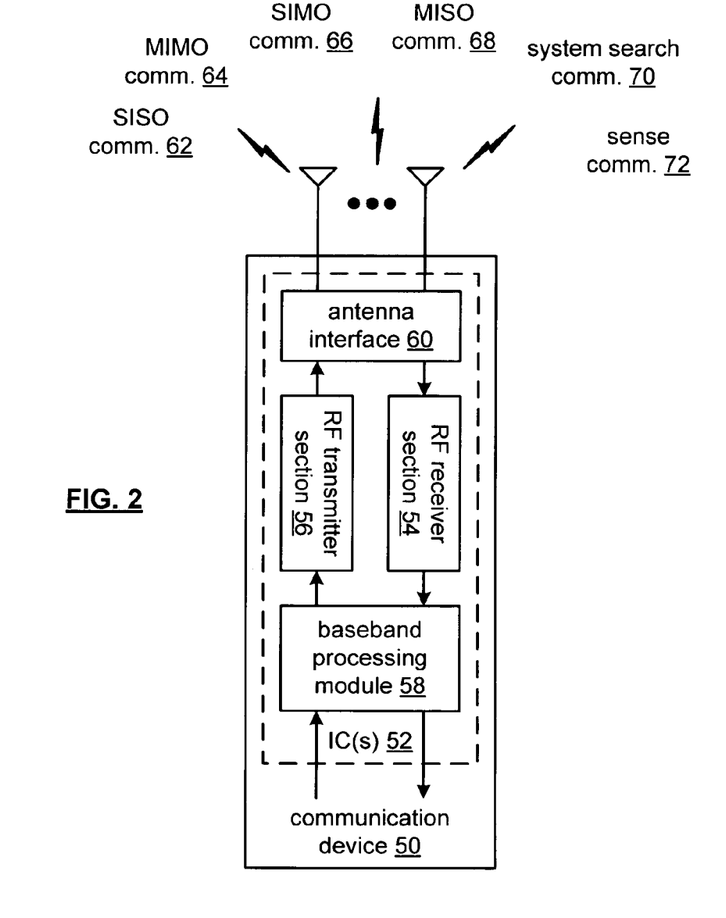
FIG. 2 is a schematic block diagram of an embodiment of a wireless communication device in accordance with the present invention.

FIG. 2 is a schematic block diagram of an embodiment of wireless communication device 50, which may be one of the communication devices 18-32 of FIG. 1 or may be another type of wireless communication device. The wireless communication device 50 includes one or more integrated circuit (IC) 52 coupled to an antenna interface 60. The one or more ICs 52 includes a radio frequency (RF) receiver section 54, an RF transmitter section 56, and a baseband processing module 58. The antenna interface 60 is coupled to an antenna system that may include one or more antennas to provide a diversity antenna structure, to provide an in-air beamforming structure, to provide a polarized antenna structure, to provide a multiple input multiple output (MIMO) communication 64 antenna structure, to provide a single input single output (SISO) communication 62 antenna structure, to provide a single input multiple output (SIMO) communication 66 antenna structure, to provide a multiple input single output (MISO0 communication 68 antenna structure, to provide a system search communication 70 (e.g., attempting authorization and/or association with a system) antenna structure, and/or to provide carrier sense communication 72 (e.g., detect an incoming wireless communication) antenna system.

The baseband processing module 58 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIG. 2.

The baseband processing module 58 converts outbound data 75 (e.g., a voice signal, data, a text file, an audio file, a video file, an image file, and/or a combination thereof) into an outbound symbol stream, or streams, 94 in accordance with a wireless communication protocol (e.g., IEEE 802.11 a, b, g, n, etc., Bluetooth, ZigBee, GSM, CDMA, WCDMA, EDGE, GPRS, HSDPA, HSUPA, etc.). The baseband processing module 58 also converts an inbound symbol stream, or streams, 96 into inbound data 65 (e.g., a voice signal, data, a text file, an audio file, a video file, an image file, and/or a combination thereof). Note that the baseband processing module 58 generates multiple outbound symbol streams from the outbound data when it is functioning in accordance with IEEE 802.11n, when it is performing baseband beamforming, and/or another type of multiple output communication protocol.

The RF receiver section 54 converts an inbound RF signal, or signals, into the inbound symbol stream, or streams, 96 based on a receive local oscillation. The RF transmitter section 56 is coupled to convert the outbound symbol stream, or streams, 94 into an outbound RF signal, or signals. Depending on the mode of the receiver, the RF receiver section 54 is operable to conserve power.

Figure 3:
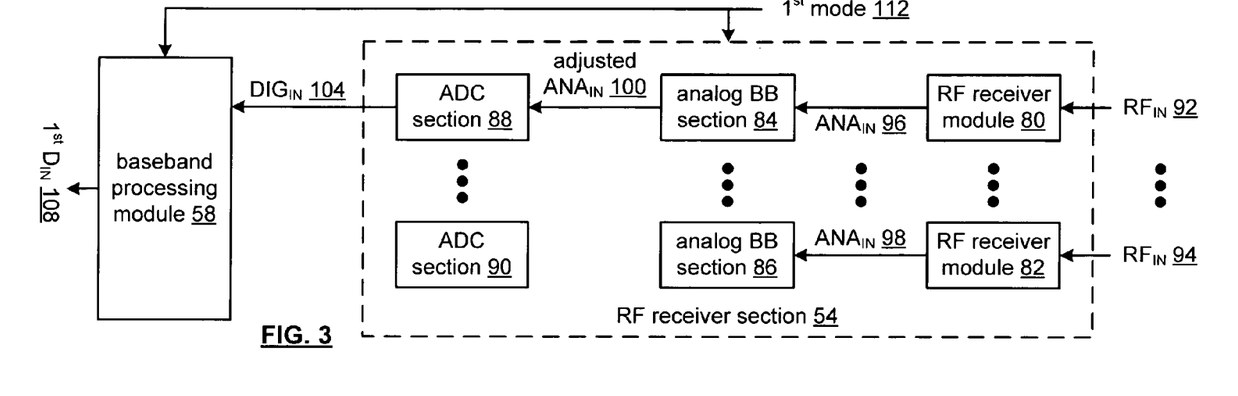
FIG. 3 is a schematic block diagram of an embodiment of a receiver in a first mode of operation in accordance with the present invention.

FIG. 3 is a schematic block diagram of an embodiment of a receiver in a first mode of operation 112. The receiver includes the baseband processing module 58 and the RF receiver section 54. The RF receiver section includes a plurality of RF receiver modules 80-82, a plurality of analog baseband sections 84-86, and a plurality of analog to digital conversion (ADC) sections 88-90. Note that the first mode 112 may correspond to a waiting mode such as a carrier sense mode, a sniff mode, a single receiver input mode (e.g., engaged in a SISO and/or SIMO communication) and/or any other mode where a single receiver path can be active to support the current wireless communication function.

In this mode 112, the plurality of RF receiver modules 80-82 (an embodiment of which will be described in greater detail with reference to FIG. 4) is active to convert inbound RF signals 92-94 into a plurality of inbound analog signals 96-98. The RF receiver modules 80-82 may be direct conversion receiver modules to produce the inbound analog signals 96-98 to be baseband signals or low intermediate frequency (IF) signals (e.g., a carrier frequency up to a few MHz). Alternatively, the RF receiver modules 80-82 may produce the inbound analog signals 96-98 to have an IF carrier frequency in the MHz to GHz range.

One of the plurality of analog baseband sections 84-86 (an embodiment of which will be described in greater detail with reference to FIG. 6), is active to adjust one of the plurality of inbound analog signals 96-98 to produce an adjusted inbound analog signal 100. The adjusting of the inbound analog signal 96 or 98 may include attenuating the signal, amplifying the signal, and/or filtering the signal.

In the first mode 112, one of the plurality of analog to digital conversion sections 88-90 is active to convert the adjusted inbound analog signal 100 into an inbound digital signal 104. A portion of the digital baseband processing module 58 is active to convert the inbound digital signal 104 into inbound data 108. For example, when the receiver is in a carrier sense mode, it receives inbound RF signals that include a preamble of short and long training signals. The RF receiver modules 80-82 convert the short and long training signals into baseband analog training signals. The analog baseband section 84 and the ADC section 88 convert the baseband analog training signals into the inbound digital signal 104. A portion of the digital baseband processing module 58 processes the inbound digital signal 104 to determine whether the received inbound RF signals are valid, type of communication, and/or addressing the present communication device. Such information is reflected in the inbound data 108. If the received inbound RF signals are not valid or not intended for the present communication device, the receive remains in the first mode 112. If, however, the received inbound RF signals are valid, intended for the present communication device, and are of a MISO or MIMO type communication, the receiver switches to a second mode 114.

Figure 4:
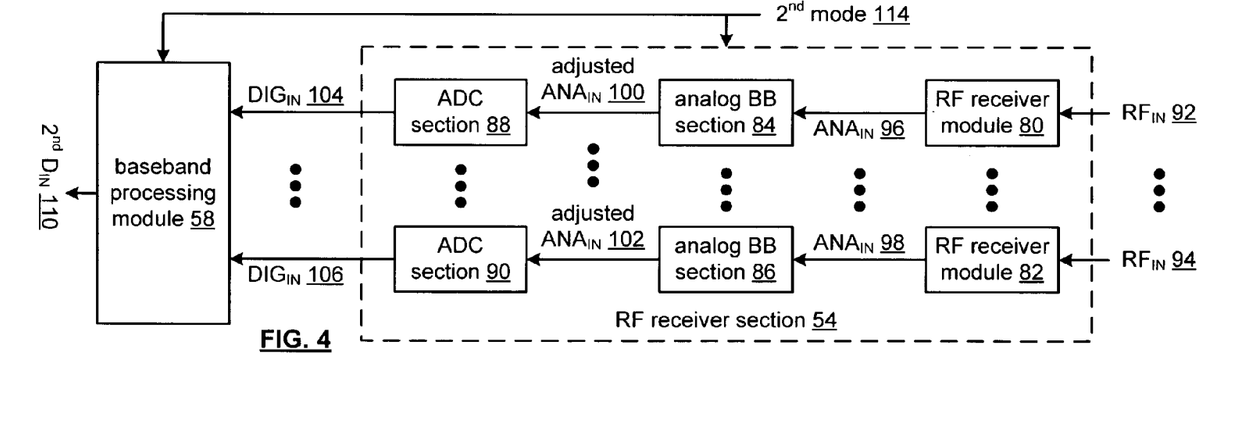
FIG. 4 is a schematic block diagram of an embodiment of a receiver in a second mode of operation in accordance with the present invention.

FIG. 4 is a schematic block diagram of an embodiment of the receiver in a second mode of operation 114 (e.g., a multiple input multiple output (MIMO) mode). In this mode, the plurality of RF receiver modules 80-82 is coupled to convert the inbound RF signals 92-94 into a plurality of inbound analog signals 96-98. The plurality of analog baseband sections 84-86 is active to adjust the plurality of inbound analog signals to produce a plurality of adjusted inbound analog signals 100-102. In an embodiment, the adjusting includes attenuating the signals, amplifying the signals, and/or filtering the signals.

In the second mode 114, the plurality of analog to digital conversion sections 88-90 is active to convert the plurality of adjusted inbound analog signals 100-102 into a plurality of inbound digital signals 104-106. The digital baseband processing module 58 is active to convert the plurality of inbound digital signals 104-106 into second inbound data 110. In this mode, 114, the receiver converts the inbound RF signals 92-94 into the second inbound data 110, which may be a voice signal, data, a text file, an audio file, a video file, an image file, and/or a combination thereof.

Figure 5:
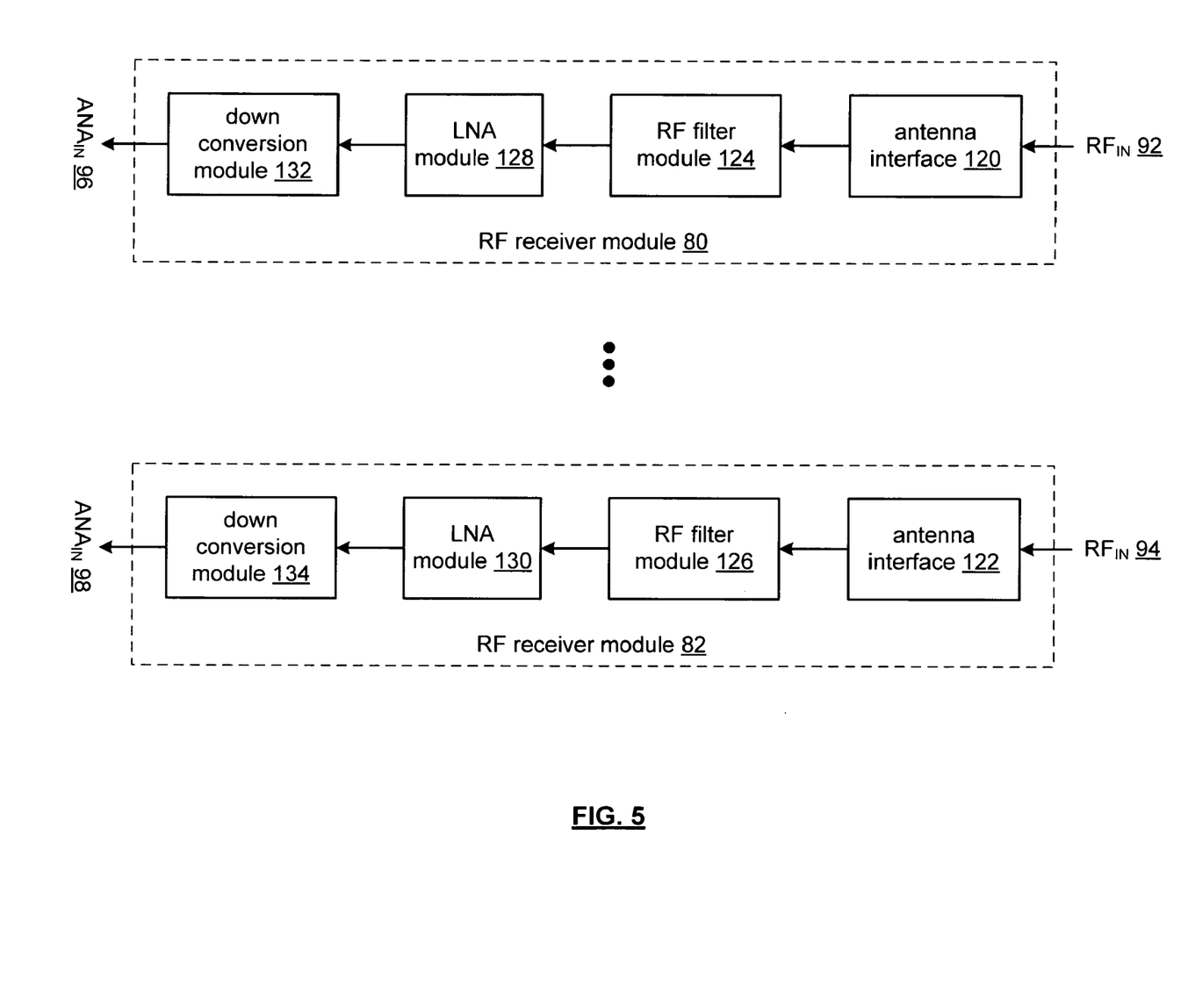
FIG. 5 is a schematic block diagram of an embodiment of an RF receiver module in accordance with the present invention.

FIG. 5 is a schematic block diagram of an embodiment of an RF receiver module 80-82 that includes an antenna interface 120, 122, an RF filter module 124, 126, a low noise amplifier (LNA) module 128, 130, and a down conversion module 132, 134. The antenna interface 120, 122, which may include a transformer balun, a transmission line, and/or an impedance matching circuit, is coupled to the antenna system to receive the inbound RF signal 92, 94 and to provide it to the RF filter module 124, 126.

The RF filter module 124, 126, which may be a fixed bandpass filter or a tunable bandpass filter, filters the inbound RF signal 92, 94 to produce a filtered inbound RF signal. The LNA module 128, 130, which may include one or more low noise amplifiers coupled in series and/or in parallel, amplifies the filtered inbound RF signal to produce an amplified inbound RF signal. The down conversion module 132, 134, which may include one or more mixers, a low pass filter, a bandpass filter, and/or a combining module, converts the amplified inbound RF signal into the inbound analog signal 96-98.

Figure 6:
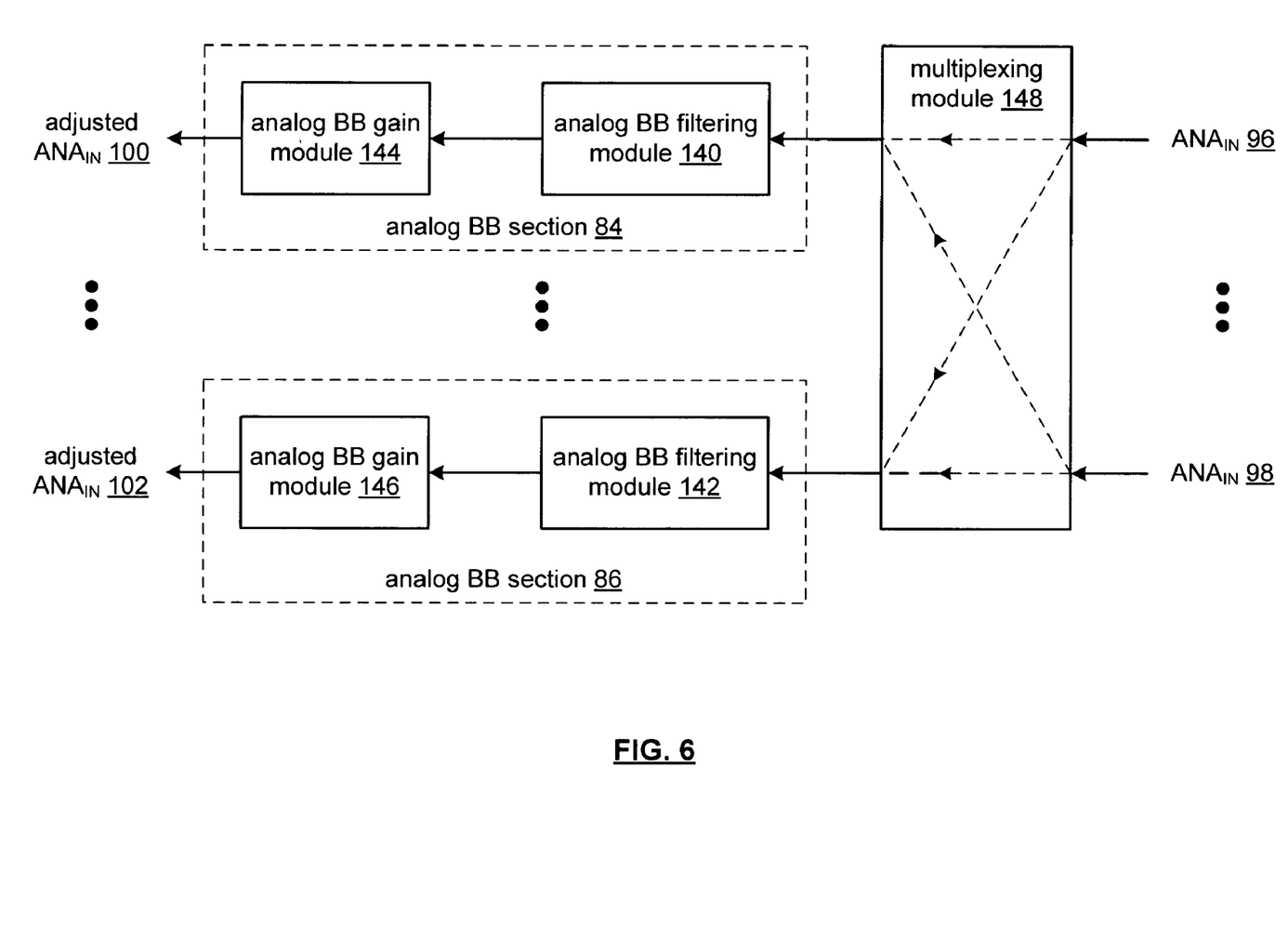
FIG. 6 is a schematic block diagram of an embodiment of analog baseband sections and a multiplexing module in accordance with the present invention.

FIG. 6 is a schematic block diagram of an embodiment of analog baseband sections 84-86 and a multiplexing module 148. Each of the analog baseband sections 84-86 includes an analog baseband filtering module 140, 142, and/or an analog baseband gain module 114, 146.

The multiplexing module 148, which includes one or more multiplexers, switches, transistors, etc., receives the inbound analog signals 96-98 from the RF section 54. When the receiver is in the first mode 112, the multiplexing module 148 provides one of the inbound analog signals 96-98 to one of the analog baseband sections 84-86. For example, the multiplexing module 148 may provide inbound analog signal 96 to analog baseband module 84. As another example, the multiplexing module 148 may provide inbound analog signal 96 to analog baseband module 86. As other examples, the multiplexing module 148 may provide inbound analog signal 98 to analog baseband module 84 or to analog baseband module 86.

Thus, with multiple RF receiver modules 80-82 active and only one analog baseband section 84-86 active, the receiver provides a diversity structure for this single receiver path mode.

The active analog baseband module 84 or 86 filters, attenuates, and/or amplifies the inbound analog signal 96 or 98. For example, the analog baseband filtering module 140, 142, which may be a low pass filter or a bandpass filter, filters the inbound analog signal 96 or 98 to produce a filtered inbound analog signal. The analog baseband gain module 144, 146, which may include an amplifier, amplifies or attenuates the filtered inbound analog signal to produce the adjusted inbound analog signal 100, 102.

When the receiver is in the second mode 114, the multiplexing module 148 provides inbound analog signal 96 to analog baseband section 84 and provides inbound analog signal 98 to analog baseband section 86. Note that if the receiver included more paths, the multiplexing module 148 would provide one of the inbound analog signals to a corresponding one of the analog baseband sections. In this mode, each of the analog baseband sections 84-86 filters, attenuates, and/or amplifies the corresponding inbound analog signal 96-98 to produce the plurality of adjusted inbound analog signals 100-102.

In an alternative embodiment, the multiplexing module 148 may be placed between the analog baseband filtering module 140-142 and the analog baseband gain module 144-146. In this embodiment, when the receiver is in the first mode, the analog baseband filter modules 140-142 are active and only one of the analog baseband gain modules 144-146 is active. In another alternative embodiment, the multiplexing module 148 may be placed after the analog baseband gain module 144-146. In this embodiment, when the receiver is in the first mode, the analog baseband filtering module 140-142 and the analog baseband gain module 144-146 are active.

Figure 7:
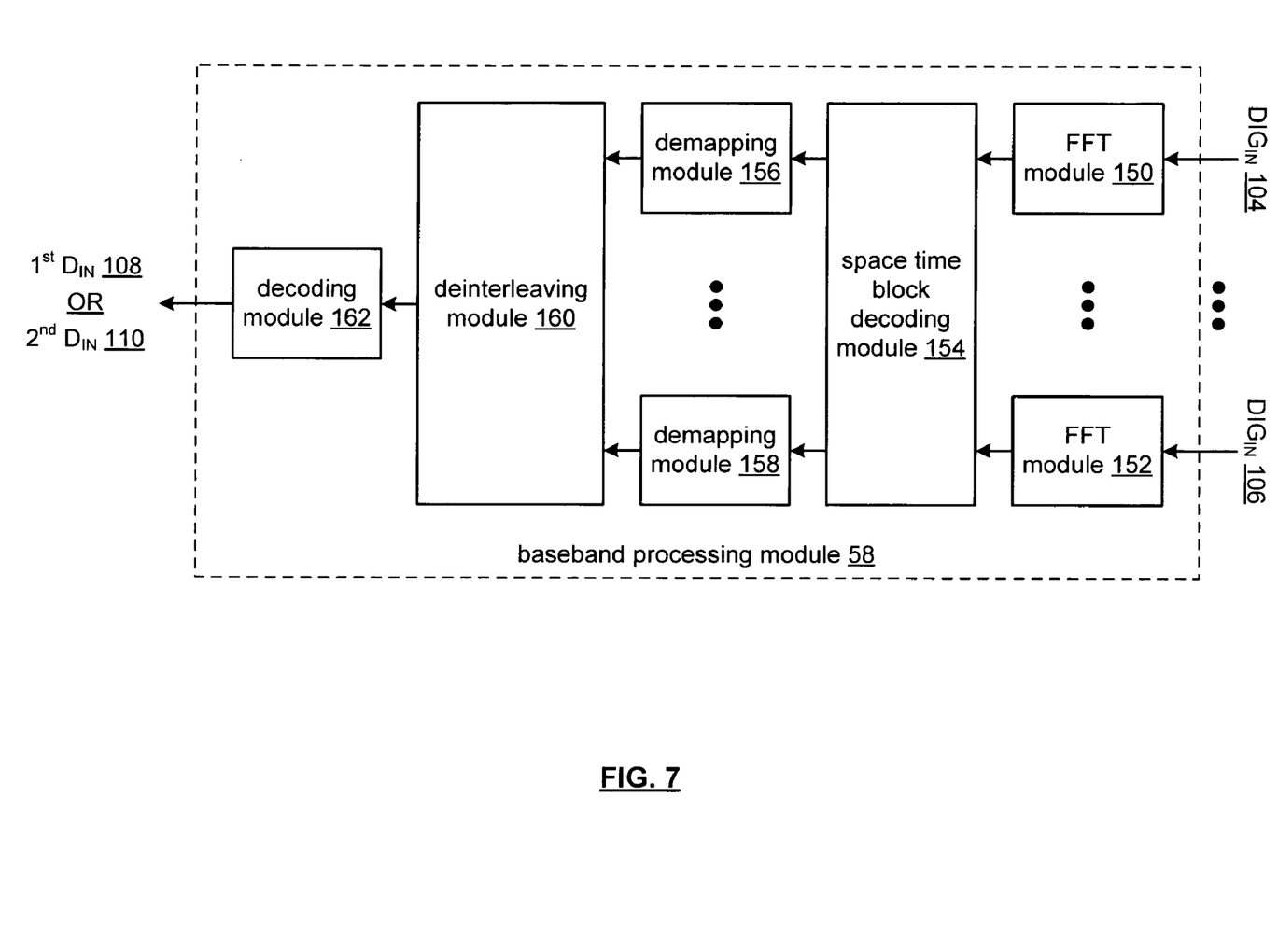
FIG. 7 is a schematic block diagram of an embodiment of a baseband processing module in accordance with the present invention.

FIG. 7 is a schematic block diagram of an embodiment of a baseband processing module 58 that includes a plurality of fast Fourier transform (FFT) modules 150-152, a space-time block decoding module 154, a plurality of demapping modules 156-158, a deinterleaving module 160, and a decoding module 162. Note that decoding and demapping performed by the baseband processing module 58 is dependent upon the wireless communication standard being supported by the wireless communication device 50.

When the receiver is in the first mode 112, one of the plurality of FFT modules 150-152 is active to convert the inbound digital signal 104-106 from the time domain to the frequency domain. In this mode, the space time decoding module 154 is by-passed when the receiver is in the first mode 112.

When the receiver is in the first mode, one of the plurality of demapping modules 156-158 is active to demap the inbound digital signal in the frequency domain to produce a demapped digital signal. The deinterleaving module 160 deinterleaves the demapped digital signal to produce a deinterleaved digital signal. The decoding module 162 decodes the deinterleaved digital signal to produce the first inbound data 108.

When the receiver is in the second mode 114, the plurality of FFT modules 150-152 are active to convert the plurality of inbound digital signals 104-106 from the time domain to the frequency domain. In this mode, the space time decoding module 154 space-time decodes the plurality of inbound digitals signals in the frequency domain to produce a plurality of space-time decoded inbound digital signals. Note that if the MIMO communication includes an equal number of transmit antennas as receive antennas, the space-time block decoding module 154 may be omitted.

With the receiver in the second mode, the plurality of demapping modules 156-158 demaps the plurality of space-time decoded inbound digital signals to produce a plurality of demapped digital signals. The deinterleaving module 160 deinterleaves the plurality of demapped digital signals to produce a second deinterleaved digital signal. The decoding module 162 decodes the second deinterleaved digital signal to produce the second inbound data 110.

Figure 8:
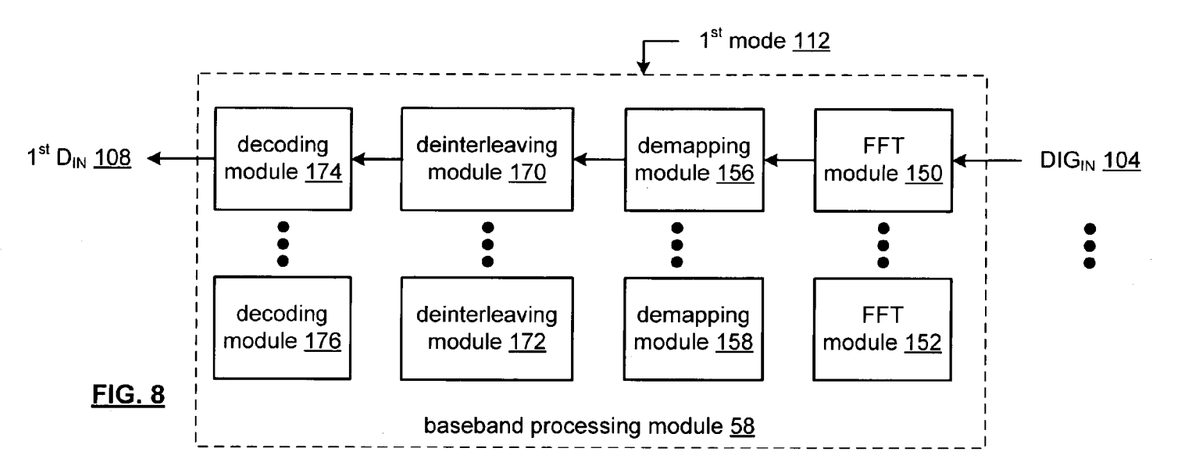
FIG. 8 is a schematic block diagram of another embodiment of a baseband processing module in a first operational mode in accordance with the present invention.

FIG. 8 is a schematic block diagram of another embodiment of a baseband processing module 58 in a first operational mode 112. The baseband processing module includes a plurality of fast Fourier transform (FFT) modules 150-152, a space-time block decoding module 154, a plurality of demapping modules 156-158, a plurality of deinterleaving modules 170-172, and a plurality of decoding modules 174-176. Note that decoding and demapping performed by the baseband processing module 58 is dependent upon the wireless communication standard being supported by the wireless communication device 50.

With the receiver in the first mode 112, one of the plurality of FFT modules 150-152 is active to convert the inbound digital signal 104-106 from the time domain to the frequency domain. One of the plurality of demapping modules 156-158 is active to demap the inbound digital signal in the frequency domain to produce a demapped digital signal. One of the deinterleaving modules 170-172 is active to deinterleave the demapped digital signal to produce a deinterleaved digital signal. One of the decoding modules 174-176 is active to decode the deinterleaved digital signal to produce the first inbound data 108.

Figure 9:
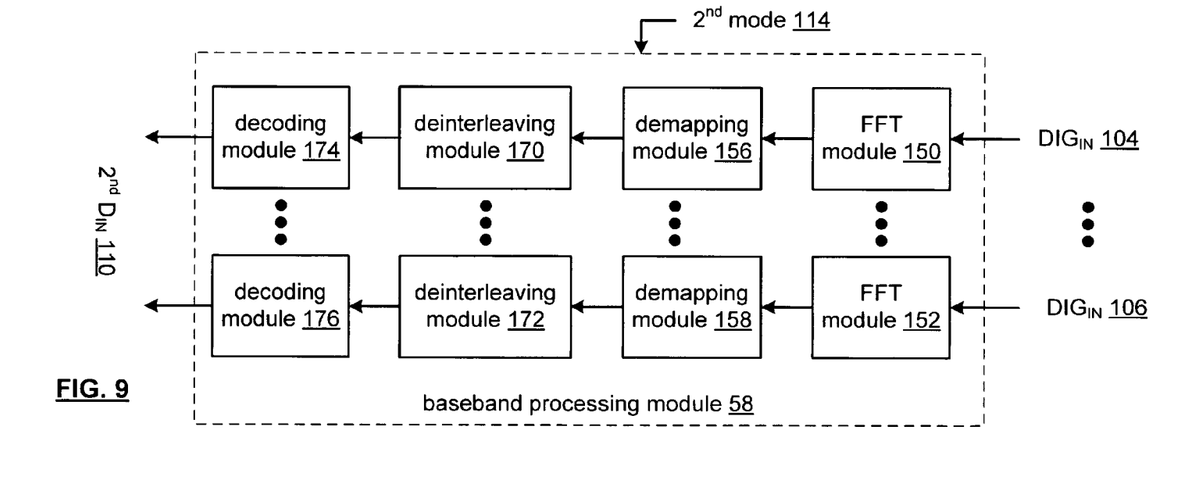
FIG. 9 is a schematic block diagram of another embodiment of a baseband processing module in a second operational mode in accordance with the present invention.

FIG. 9 is a schematic block diagram of another embodiment of a baseband processing module 58 in a second operational mode 114. The baseband processing module includes a plurality of fast Fourier transform (FFT) modules 150-152, a space-time block decoding module 154, a plurality of demapping modules 156-158, a plurality of deinterleaving modules 170-172, and a plurality of decoding modules 174-176. Note that decoding and demapping performed by the baseband processing module 58 is dependent upon the wireless communication standard being supported by the wireless communication device 50.

With the receiver in the second mode 114, the plurality of FFT modules 150-152 are active to convert the plurality of inbound digital signals 104-106 from the time domain to the frequency domain. In this mode, the space time decoding module 154 space-time decodes the plurality of inbound digitals signals in the frequency domain to produce a plurality of space-time decoded inbound digital signals. Note that if the MIMO communication includes an equal number of transmit antennas as receive antennas, the space-time block decoding module 154 may be omitted.

With the receiver in the second mode, the plurality of demapping modules 156-158 demaps the plurality of space-time decoded inbound digital signals to produce a plurality of demapped digital signals. The plurality of deinterleaving modules 170-172 deinterleaves the plurality of demapped digital signals to produce a plurality of second deinterleaved digital signals. The plurality of decoding modules 174-176 decodes the plurality of second deinterleaved digital signals to produce the second inbound data 110.

Figure 10:
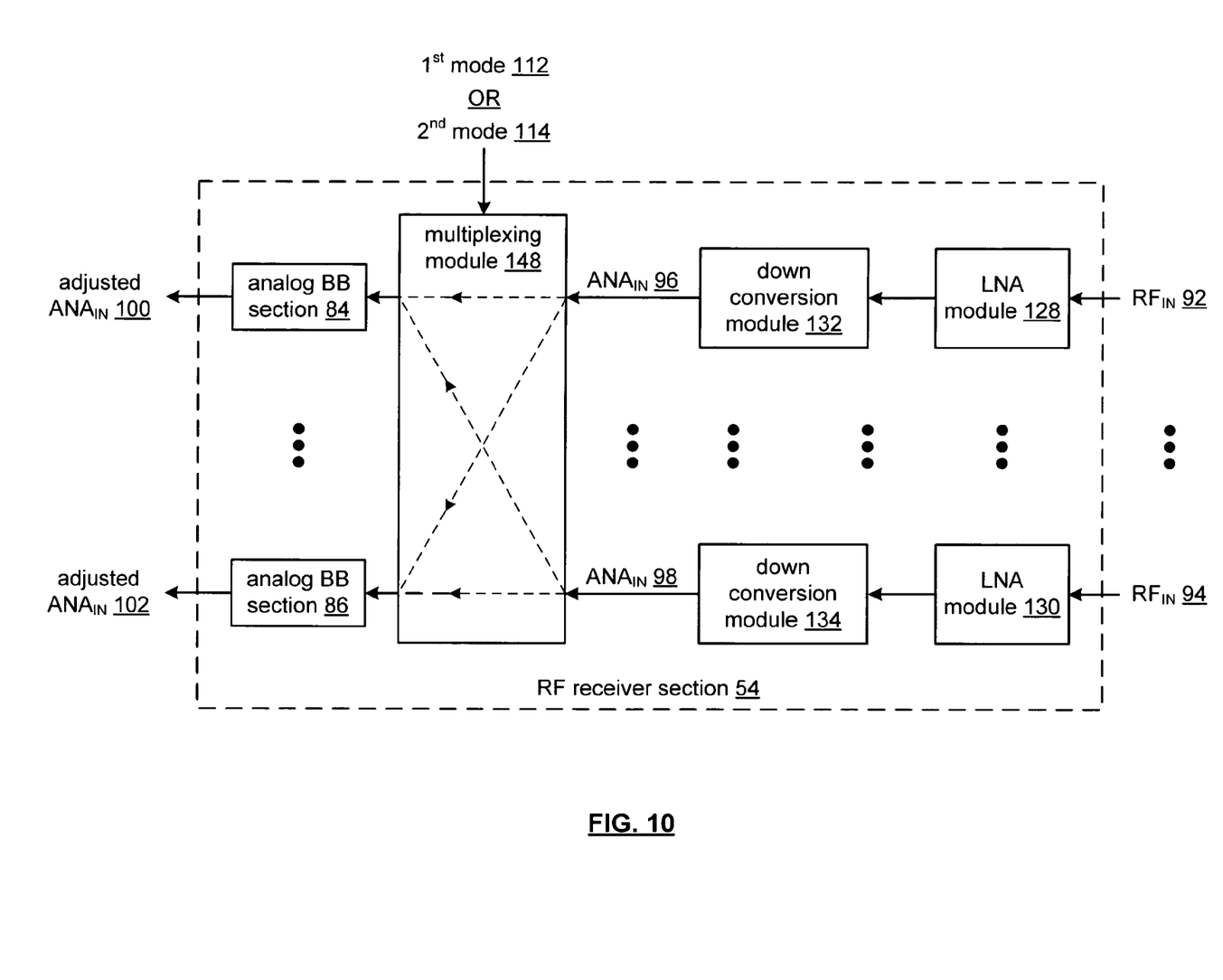
FIG. 10 is a schematic block diagram of an embodiment of an RF receiver section in accordance with the present invention.

FIG. 10 is a schematic block diagram of an embodiment of an RF receiver section 54, which may be implemented as a single integrated circuit, that includes a plurality of LNA modules 128-130, a plurality of down conversion modules 132-134, a multiplexing module 148, and a plurality of analog baseband sections 84-86.

As previously discussed, the plurality of LNA modules 128-130 amplifies a plurality of inbound RF signals 92-94 to produce a plurality of amplified inbound RF signals. The plurality of down conversion modules 132-134 convert the plurality of amplified inbound RF signals into a plurality of inbound analog signals 96-98. The inbound analog signals 96-98 may be baseband signals, low IF signals, or IF signals (e.g., have an IF carrier frequency in the MHz to GHz range).

When the RF receiver is in the first mode 112, the multiplexing module 148 outputs one of the plurality of inbound analog signals 96-98. The multiplexing module 148 may output any one of the plurality of inbound analog signals 96-98 based on received signal strength, signal to noise ratio, signal to interference ratio, and/or any other metric of determining quality of a received signal. One of the plurality of analog baseband sections 84-86 is active to adjust one of the plurality of inbound analog signals to produce an adjusted inbound analog signal 100 or 102.

When the receiver is in the second mode 114, the multiplexing module 148 outputs the plurality of inbound analog signals 96-98. The plurality of analog baseband sections 84-86 adjusts the plurality of inbound analog signals 96-98 to produce a plurality of adjusted inbound analog signals 100-102. In this mode, the multiplexing module 148 may output any one of the plurality of inbound analog signals 96-98 to any one of the plurality of analog baseband sections 84-86, one of the inbound analog signals 96-98 may be dedicated to one of the analog baseband sections 84-86, and/or any combination of providing the inbound analog signals 96-98 to the analog baseband sections 84-86.

In an embodiment, one or more of the plurality of analog baseband sections includes an analog baseband filtering module 140, 142 and/or an analog baseband gain module 144, 146. When the receiver is in the first mode, the active analog baseband filtering module filters the one of the plurality of inbound analog signals to produce a filtered inbound analog signal and the active analog baseband gain module amplifies or attenuates the filtered inbound analog signal to produce the adjusted inbound analog signal 100 or 102. When the receiver is in the second mode, the analog baseband filtering module filters a corresponding one of the plurality of inbound analog signals to produce a corresponding one of a plurality of filtered inbound analog signals and the analog baseband gain module amplifies or attenuates the corresponding one of the plurality of filtered inbound analog signals to produce a corresponding one of the plurality of adjusted inbound analog signals.

In another embodiment, the RF receiver section 54 further includes a plurality of analog to digital conversion sections 88-90. When the receiver is in the first mode, one of the plurality of analog to digital conversion sections converts the adjusted inbound analog signal into an inbound digital signal. When the receiver is in the second mode, the plurality of analog to digital conversion sections converts the plurality of adjusted inbound analog signals into a plurality of inbound digital signals.

Figure 11:
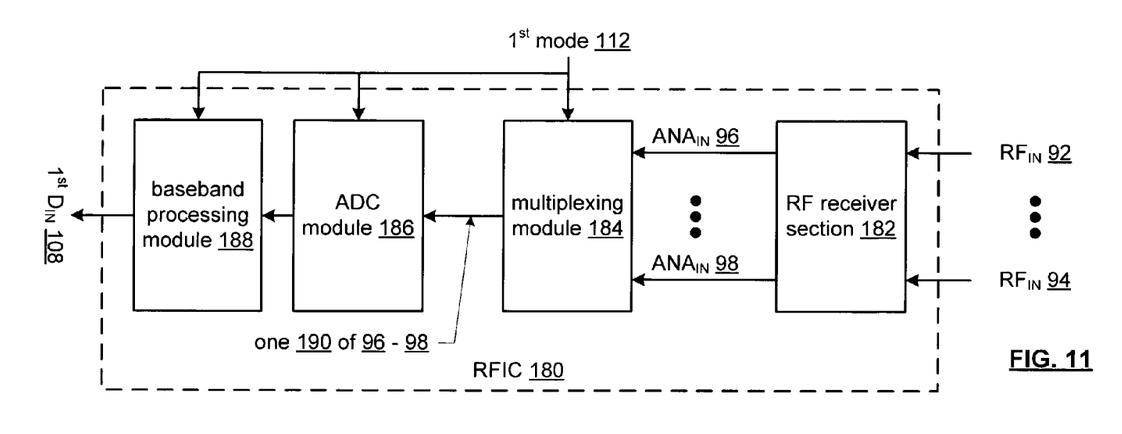
FIG. 11 is a schematic block diagram of another embodiment of an RFIC in a first operational mode in accordance with the present invention.

FIG. 11 is a schematic block diagram of another embodiment of an RFIC 180 in a first operational mode 112. The RFIC 180 includes an RF receiver section 182, a multiplexing module 184, an ADC module 186, and a baseband processing module 188. The RF receiver section 182, which includes two or more LNA modules and two or more down conversion modules, converts a plurality of inbound RF signals 92-94 into a plurality of inbound analog signals 96-98. The RF receiver section 182 may also include two or more RF filters and two or more antenna interfaces.

In this mode 112, the multiplexing module 184 outputs one of the plurality of inbound analog signals 96-98. In an embodiment, the multiplexing module 184 may include one or more multiplexers, one or more switches, and/or one or more transistors to output the one of the plurality of inbound analog signals 96-98.

The ADC module 186 is in a first ADC power mode to convert the one of the plurality of inbound analog signals 96-98 into an inbound digital signal 190. In an embodiment, the ADC module 186 includes a plurality of analog to digital converters, where, in this mode 112, only one of them is active to perform the analog to digital conversion.

The baseband processing module 188, which may include one or more processing devices as previously defined, is operable in a first receive baseband power mode to convert the inbound digital signal into inbound data 108. In this mode, the baseband processing module 188 may perform one or more of an FFT function, a demapping function, a deinterleaving function, and/or a decoding function on the single inbound digital signal 190 in accordance with the wireless communication standard, or standards, supported by the RFIC 180.

In an embodiment, the ADC module 186 includes a plurality of analog baseband filtering modules, a plurality of analog baseband gain modules, and a plurality of analog to digital converters. With the RFIC 180 in the first mode, one of the plurality of analog baseband filtering modules is active to filter the one of the plurality of inbound analog signals to produce a filtered inbound analog signal. One of the plurality of analog baseband gain modules is active to amplify or attenuate the filtered inbound analog signal to produce an adjusted inbound analog signal. One of the plurality of analog to digital converters is active to convert the adjusted inbound analog signal into the inbound digital signal 190.

Figure 12:
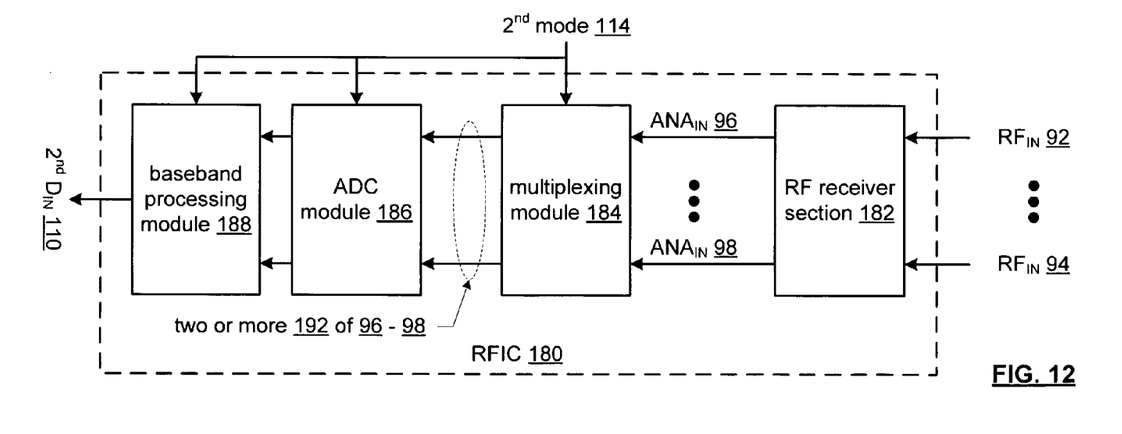
FIG. 12 is a schematic block diagram of another embodiment of an RFIC in a second operational mode in accordance with the present invention.

FIG. 12 is a schematic block diagram of another embodiment of an RFIC 180 in a second operational mode 114. In this mode 114, the RF receiver section 182 converts a plurality of inbound RF signals 92-94 into a plurality of inbound analog signals 96-98. The multiplexing module 184 outputs two or more of the plurality of inbound analog signals 96-98. As an example, the first receive mode 112 may be a carrier sense mode and the second receive mode 114 may be a multiple input multiple output (MIMO) mode.

The ADC module 186 is in a first ADC power mode to convert the two or more of the plurality of inbound analog signals into a plurality of inbound digital signals 192. The ADC module 186 consumes less power when it is in the first ADC power mode than when in the second ADC power mode.

In this mode 114, the baseband processing module 188 is operable in a second receive baseband power mode to convert the plurality of inbound digital signals 190 into second inbound data 110. The baseband processing module 188 may perform one or more of an FFT function, space-time decoding, a demapping function, a deinterleaving function, and/or a decoding function on the single inbound digital signal 192 in accordance with the wireless communication standard, or standards, supported by the RFIC 180. In addition, the baseband processing module 188 consumes less power when in the first receive baseband power mode than when in the second receive baseband power mode.

In an embodiment, the ADC module 186 includes a plurality of analog baseband filtering modules, a plurality of analog baseband gain modules, and a plurality of analog to digital converters. With the RFIC is in the second receive mode, two or more of the plurality of analog baseband filtering modules are active to filter the two or more of the plurality of inbound analog signals to produce a plurality of filtered inbound analog signals. In addition, two or more of the plurality of analog baseband gain modules are active to amplify or attenuate the plurality of filtered inbound analog signals to produce a plurality of adjusted inbound analog signals. Further, two or more of the plurality of analog to digital converters are active to convert the plurality of adjusted inbound analog signals into the plurality or inbound digital signals 192.

Figure 13:
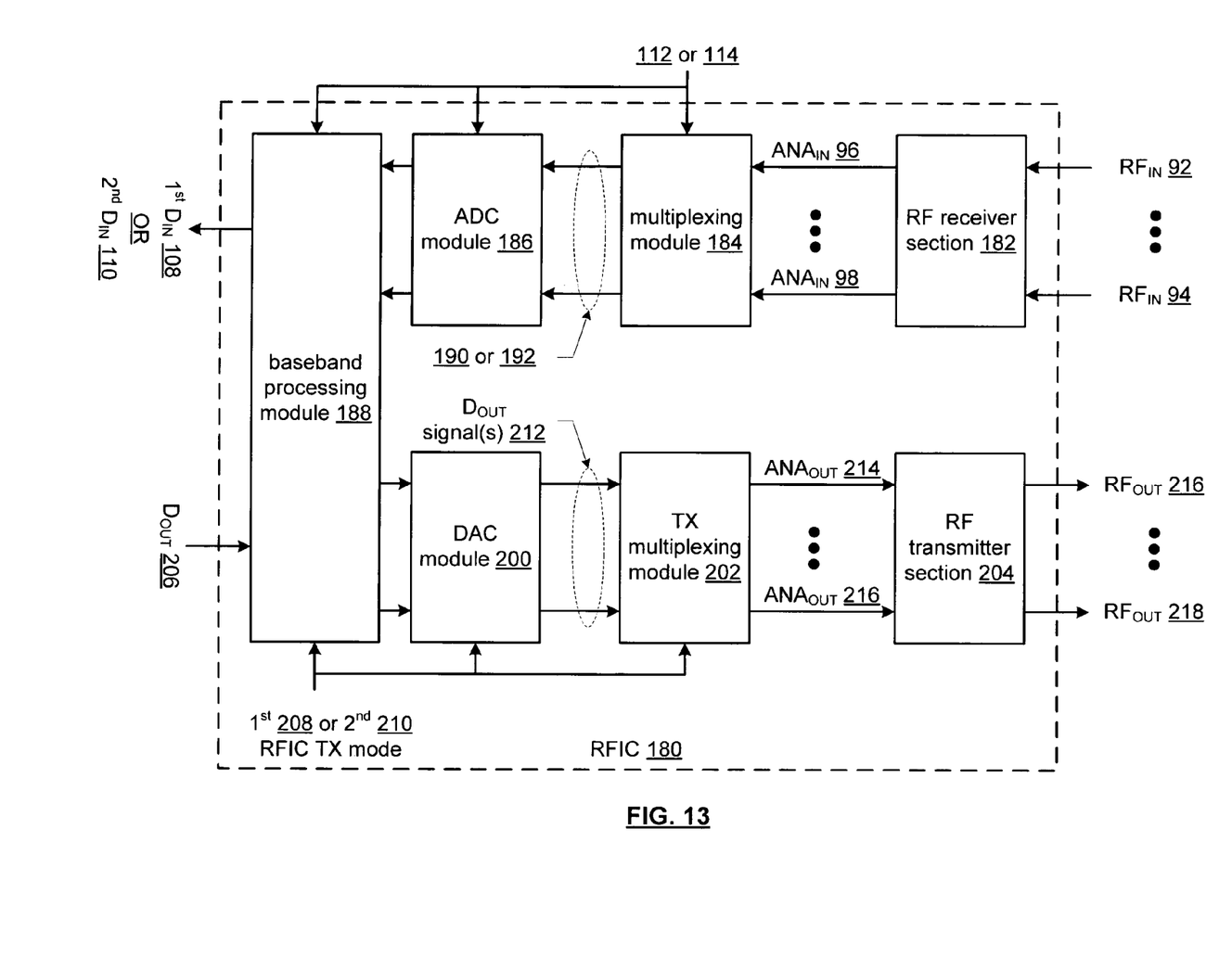
FIG. 13 is a schematic block diagram of another embodiment of an RFIC in accordance with the present invention.

FIG. 13 is a schematic block diagram of another embodiment of an RFIC 180 that includes the baseband processing module 188, the ADC module 186, the multiplexing module 184, the RF receiver section 182, a DAC module 200, a transmit (TX) multiplexing module 202, and an RF transmitter section 204. With respect to the inbound RF signals 92-92, the baseband processing module 188, the ADC module 186, the multiplexing module 184, and the RF receiver section 182 operate as discussed with reference to FIGS. 11 and 12 to produce the inbound data 108 and/or 110.

In this embodiment, the baseband processing module 188 is operable in a first transmit baseband power mode to convert outbound data 206 into an outbound digital signal when the RFIC 180 is in a first transmit mode 208 and is operable in a second transmit baseband power mode to convert the outbound data 206 into a plurality of outbound digital signals when the RFIC 180 is in a second transmit mode 210. In the first transmit baseband power mode, the baseband processing module 188 consumes less power that when it is in the second transmit baseband power mode. As an example, the first transmit mode may correspond to a MISO or SISO wireless communication and the second transmit module 210 may correspond to a SIMO or a MIMO wireless communication.

The DAC module 200, which may include a plurality of digital to analog converters, a plurality of analog baseband filters, and/or a plurality of analog baseband amplifiers, is operable in a first DAC power mode to convert the outbound digital signal into an outbound analog signal 212 when the RFIC is in the first transmit mode 208. The DAC module 200 is operable in a second DAC power mode to convert the plurality of outbound digital signals into a plurality of outbound analog signals 212 when the RFIC is in the second transmit mode 212. In this embodiment, the DAC module 200 consumes less power when it is in the first DAC power mode than when it is in the second DAC power mode.

The transmit multiplexing module 202, which may include one or more multiplexers, one or more switches, and/or one or more transistors, is coupled to output the outbound analog signal 214 when the RFIC is in a first transmit mode 208 and to output two or more of the plurality of outbound analog signals 214-216 when the RFIC is in a second transmit mode 210. The RF transmitter section 204, which may include two or more up-conversion modules and two or more power amplifier modules, is coupled to convert the outbound analog signal 214 into an outbound RF signal and to convert the two or more of the plurality of outbound analog signals 214-216 into a plurality of outbound RF signals.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A receiver comprises:
    a plurality of radio frequency (RF) receiver modules coupled to a plurality of antennas, wherein the plurality of RF receiver modules convert inbound RF signals into a plurality of inbound analog signals;
    a plurality of analog baseband sections, wherein, when the receiver is in a first mode, only one of the plurality of analog baseband sections is selected from the plurality of analog baseband sections and selectively made active to adjust only one of the plurality of inbound analog signals to produce an adjusted inbound analog signal and, when the receiver is in a second mode, the plurality of analog baseband sections are made active to adjust the plurality of inbound analog signals to produce a plurality of adjusted inbound analog signals;
    a plurality of analog to digital conversion sections, wherein, when the receiver is in the first mode, only one of the plurality of analog to digital conversion sections corresponding to the selected analog baseband section is selectively made active to convert the adjusted inbound analog signal into an inbound digital signal and, when the receiver is in the second mode, the plurality of analog to digital conversion sections are made active to convert the plurality of adjusted inbound analog signals into a plurality of inbound digital signals;
    a digital baseband processing module, wherein, when the receiver is in the first mode, only a portion of the digital baseband processing module is made active to process the inbound digital signal into inbound data and, when the receiver is in the second mode, the digital baseband processing module is made active to process the plurality of inbound digital signals into second inbound data, wherein when in the first mode, only a single receive path is selectively made active to the digital baseband processing module and the digital baseband processing module performs baseband processing for the single receive path, and when in the second mode, plurality of receive paths are made active to the digital baseband processing module and the digital baseband processing module switches to perform baseband processing for the plurality of receive paths; and
    a multiplexing module coupled to the plurality of RF receiver modules and the plurality of analog baseband sections, wherein, when the receiver is in the first mode, the multiplexing module selects only one of the plurality of inbound analog signals intended for processing and couples only the one selected inbound analog signal to the one analog baseband section made active from the plurality of analog baseband sections, but when the receiver is in the second mode, the multiplexing module couples the plurality of inbound analog signals to the plurality of analog baseband sections, in which the multiplexing module is configured to switch any one of the inbound analog signals to any one of the plurality of analog baseband sections and switches the one selected inbound analog signal to the selected analog baseband section when the receiver is in the first mode.

2. The receiver of claim 1, wherein an RF receiver module of the plurality of plurality of RF receiver modules comprises:
    a low noise amplifier (LNA) module coupled to amplify a corresponding one of the inbound RF signals to produce an amplified inbound RF signal; and
    a down conversion module coupled to convert the amplified inbound RF signal into a corresponding one of the plurality of inbound analog signals based on a receiver local oscillation.

3. The receiver of claim 2, wherein the RF receiver module further comprises at least one of:
    an antenna interface module coupled to a corresponding one of the plurality of antennas, wherein the antenna interface module provides desire antenna matching for RF receiver module; and
    an RF filter module coupled to bandpass filter the corresponding one of the inbound RF signals prior to amplification by the LNA module.

4. The receiver of claim 1, wherein an analog baseband section of the plurality of analog baseband sections comprises:
    an analog baseband filtering module, wherein, when activated when the receiver is in the first mode, the analog baseband filtering module filters only the one inbound analog signal to produce a filtered inbound analog signal; and an analog baseband gain module, wherein, when activated when the receiver is in the first mode, the analog baseband gain module amplifies or attenuates the filtered inbound analog signal to produce the adjusted inbound analog signal.

5. The receiver of claim 4 further comprises:

the analog baseband filtering module filtering a corresponding one of the plurality of inbound analog signals to produce a corresponding one of a plurality of filtered inbound analog signals when the receiver is in the second mode; and the analog baseband gain module amplifying or attenuating the corresponding one of the plurality of filtered inbound analog signals to produce a corresponding one of the plurality of adjusted inbound analog signals when the receiver is in the second mode.

6. The receiver of claim 1 further comprises:

the first mode being a carrier sense mode; and the second mode being a multiple input multiple output (MIMO) mode.

7. The receiver of claim 1, wherein the digital baseband processing module comprises:

a plurality of fast Fourier transform (FFT) modules, wherein, when the receiver is in the first mode, only one of the plurality of FFT modules is active to convert the inbound digital signal from the time domain to the frequency domain and, when the receiver is in the second mode, the plurality of FFT modules converts the plurality of inbound digital signals from the time domain to the frequency domain;

a space time decoding module, wherein, when the receiver is in the second mode, the space time decoding module space-time decodes the plurality of inbound digitals signals in the frequency domain to produce a plurality of space-time decoded inbound digital signals;

a plurality of demapping modules, wherein, when the receiver is in the first mode, only one of the plurality of demapping modules is active to demap the inbound digital signal in the frequency domain to produce a demapped digital signal and, when the receiver is in the second mode, the plurality of demapping modules demaps the plurality of space-time decoded inbound digital signals to produce a plurality of demapped digital signals;

deinterleaving module, wherein, when the receiver is in the first mode, the deinterleaving module deinterleaves the demapped digital signal to produce a deinterleaved digital signal and, when the receiver is in the second mode, the deinterleaving module deinterleaves the plurality of demapped digital signals to produce a second deinterleaved digital signal; and a decoding module coupled to decode the deinterleaved digital signal to produce the inbound data when the receiver is in the first mode and to decode the second deinterleaved digital signal to produce the second inbound data when the receiver is in the second mode.

8. The receiver of claim 1, wherein the digital baseband processing module comprises:

a plurality of fast Fourier transform (FFT) modules, wherein, when the receiver is in the first mode, only one of the plurality of FFT modules is active to convert the inbound digital signal from the time domain to the frequency domain and, when the receiver is in the second mode, the plurality of FFT modules converts the plurality of inbound digital signals from the time domain to the frequency domain;

a plurality of demapping modules, wherein, when the receiver is in the first mode, only one of the plurality of demapping modules is active to demap the inbound digital signal in the frequency domain to produce a demapped digital signal and, when the receiver is in the second mode, the plurality of demapping modules demaps the plurality of inbound digital signals in the frequency domain to produce a plurality of demapped digital signals;

a plurality of deinterleaving modules, wherein, when the receiver is in the first mode, only one of the plurality of deinterleaving modules is active to deinterleave the demapped digital signal to produce a deinterleaved digital signal and, when the receiver is in the second mode, the plurality of deinterleaving modules is active to deinterleave the plurality of demapped digital signals to produce a plurality of deinterleaved digital signals; and a plurality of decoding modules, wherein, when the receiver is in the first mode, only one of the plurality of decoding modules is active to decode the deinterleaved digital signal to produce the inbound data and, when the receiver is in the second mode, the plurality of decoding modules is active to decode the plurality of deinterleaved digital signals to produce the second inbound data.

* * * * *